(12) United States Patent
Thiemke

(10) Patent No.: US 7,914,083 B2
(45) Date of Patent: Mar. 29, 2011

(54) ON DEMAND PROP ROD FOR UTILITY VEHICLE CARGO BOX

(75) Inventor: Daniel Bruce Thiemke, Sun Prairie, WI (US)

(73) Assignee: Deere & Company, Moline, IL (US)

(*) Notice: Subject to any disclaimer, the term of this patent is extended or adjusted under 35 U.S.C. 154(b) by 366 days.

(21) Appl. No.: 12/206,351

(22) Filed: Sep. 8, 2008

(65) Prior Publication Data

US 2010/0060071 A1 Mar. 11, 2010

(51) Int. Cl.
*B60P 1/04* (2006.01)

(52) U.S. Cl. .................................. 298/17 B; 298/17 R

(58) Field of Classification Search ................ 298/17 B, 298/17 R, 19 B, 19 R; 217/60 R, 61, 60 B, 217/60 D; 180/69.21; 248/351, 357; 280/763.1, 280/764.1, 765.1, 766.1; 292/338
See application file for complete search history.

(56) References Cited

U.S. PATENT DOCUMENTS

| | | | |
|---|---|---|---|
| 5,267,780 A | 12/1993 | Friesen et al. | |
| 5,997,067 A | 12/1999 | Shambeau et al. | |
| 6,471,299 B2 * | 10/2002 | Brooks et al. | 298/17 B |

* cited by examiner

*Primary Examiner* — Stephen Gordon

(57) ABSTRACT

A prop rod for a utility vehicle cargo box has a first end pivotally connected to a frame member of the cargo box, and a second end slidable along a slot in a frame member of the utility vehicle. The slot has a downwardly directed notch at a rear portion thereof. The prop rod is biased to a disengaged position in which the second end or the prop rod cannot enter the notch. The prop rod is sufficiently flexible so that an operator can overcome the bias and move the prop rod to an engaged position in which the second end can enter the notch to hold up the cargo box in a raised position.

6 Claims, 2 Drawing Sheets

ON DEMAND PROP ROD FOR UTILITY VEHICLE CARGO BOX

FIELD OF THE INVENTION

This invention relates to cargo boxes for off-road utility vehicles used for agricultural, industrial or recreational purposes, and specifically to support rods for a tiltable cargo box.

BACKGROUND OF THE INVENTION

Off-road utility vehicles are often equipped with cargo boxes for carrying various items including tools, supplies, or bulk materials. A cargo box may be unloaded by raising the front of the box and tilting the box to dump the material rearwardly. Additionally, utility vehicles may have drive and operational components located beneath the cargo box, requiring tilting the box to provide access for service and/or maintenance.

U.S. Pat. No. 5,267,780 entitled "Box Latch and Prop Rod" relates to a prop rod that quickly and easily secures the cargo box in its elevated or tilted position for unloading of material. When the operator raises the cargo box, the angle of force through the rod from the box urges the lower end of the rod into a seat or notch in a slot or track in the utility vehicle frame. The rod then secures the box in its tilted or upright position. To unfasten the rod and lower the box, the operator moves the lower end of the rod out of the seat or slot, allowing it to slide along the track until it reaches the end of the track. Once the box is lowered, the rod secures the box in its horizontal position during transport and operation.

Additionally, to assist in lifting a utility vehicle cargo box, a gas cylinder may be connected between the frame and box. The gas cylinder may help lift the box up toward the raised or tilted position, but may not provide enough support to hold the box securely in that position. As a result, a prop rod also may be needed as a secondary limit on the open angle of the cargo box, so there will be no load path through the gas cylinder.

However, a utility vehicle operator may prefer not to use a prop rod to support the cargo box every time he or she raises the box. For example, an operator may prefer not to use a prop rod when he or she raises the cargo box briefly to dump material. A prop rod is needed for a utility vehicle cargo box that an operator can use on demand.

SUMMARY OF THE INVENTION

A prop rod for a utility vehicle cargo box includes a longitudinal slot in the utility vehicle frame member, the slot having a downwardly directed notch at a rear portion thereof. The prop rod has a first end pivotally connected to the cargo box and a second end slidable along the slot. A bar secured to the second end of the rod is slidable in the slot along with the prop rod and blocks the second end of the prop rod from entering the notch in a disengaged position. The operator can flex or shift the prop rod to move the bar out from the slot so that the prop rod can enter the notch and support the cargo box in the raised position.

DESCRIPTION OF THE PREFERRED EMBODIMENT

Figure 1:
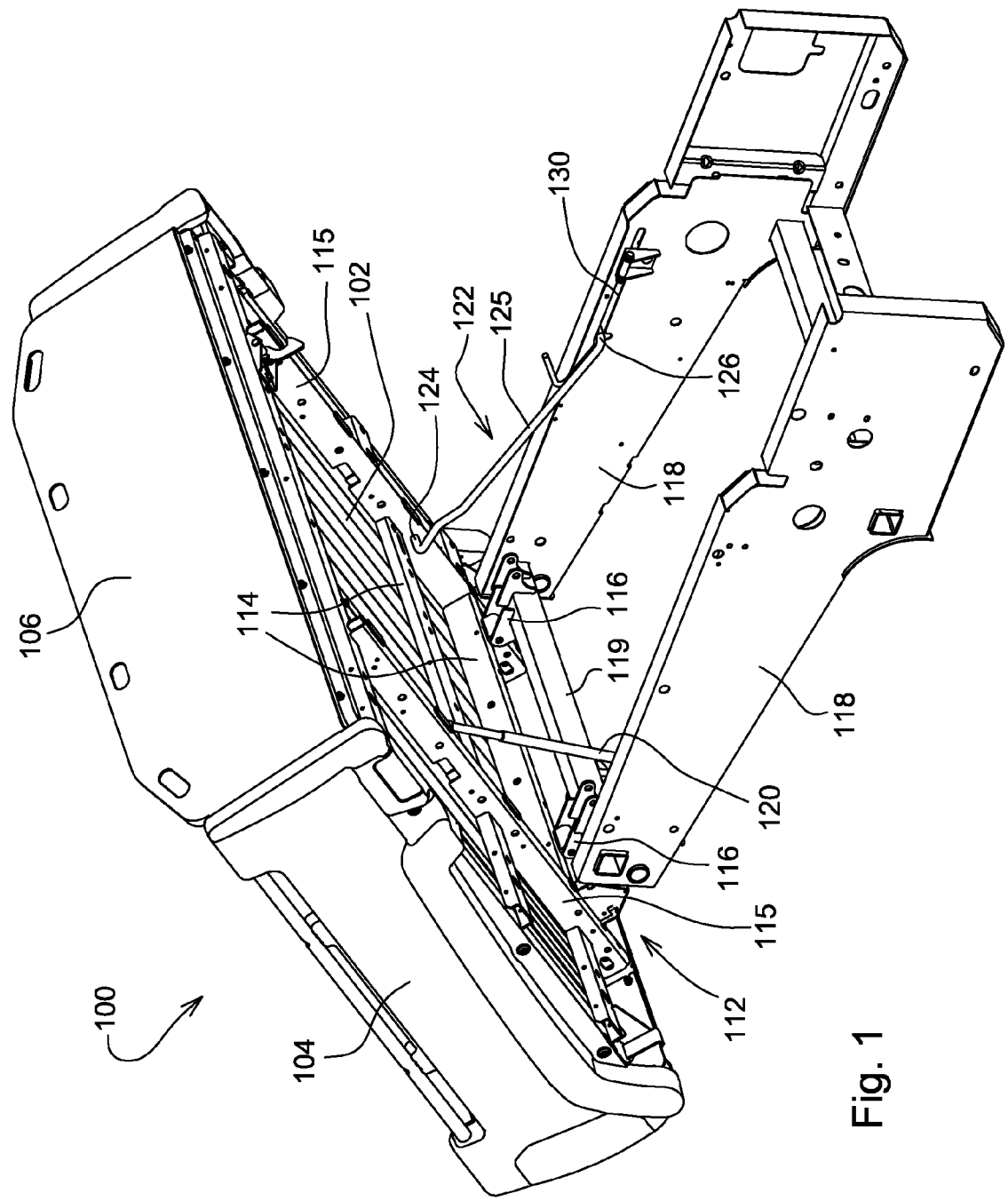
FIG. 1 is a perspective view of a utility vehicle cargo box with an on demand prop rod according to a first embodiment of the invention.

In a first embodiment of the invention shown in FIG. 1, cargo box 100 for a utility vehicle may have a floor 102, side panels 104, and load guard 106. The floor of the cargo box may be attached to a support frame 112 having transverse frame members 114 and longitudinal frame members 115. Hinges 116 may pivotably fasten the cargo box support frame to the rear of utility vehicle longitudinal frame members 118 and cross members 119. Gas cylinder 120 may be connected between the cargo box support frame and the utility vehicle frame, to help lift the cargo box to the raised or tilted position.

In one embodiment, on demand prop rod 122 may be a steel or other metal rod having a first or upper end portion 124 which may be pivotally received in or adjacent cargo box longitudinal frame member 115. The first or upper end portion of the on demand prop rod may include a leg that is bent at an angle of about ninety degrees from the longitudinal portion 125 of the on demand prop rod.

In one embodiment, the second or lower end portion 126 of the on demand prop rod includes leg member 128 that is slidably received in a longitudinal slot or track 130 carried in the frame 118 of a utility vehicle. To enter the slot, leg member 128 may be bent at an angle of about ninety degrees from the longitudinal center section of the prop rod. One or more abutments 129 at or near the tip of the leg member may prevent removal of the leg member from the slot or track while the on demand prop rod is in either of the engaged or disengaged positions, or at any other position along the slot or track as the cargo box is raised or lowered.

Figure 2:
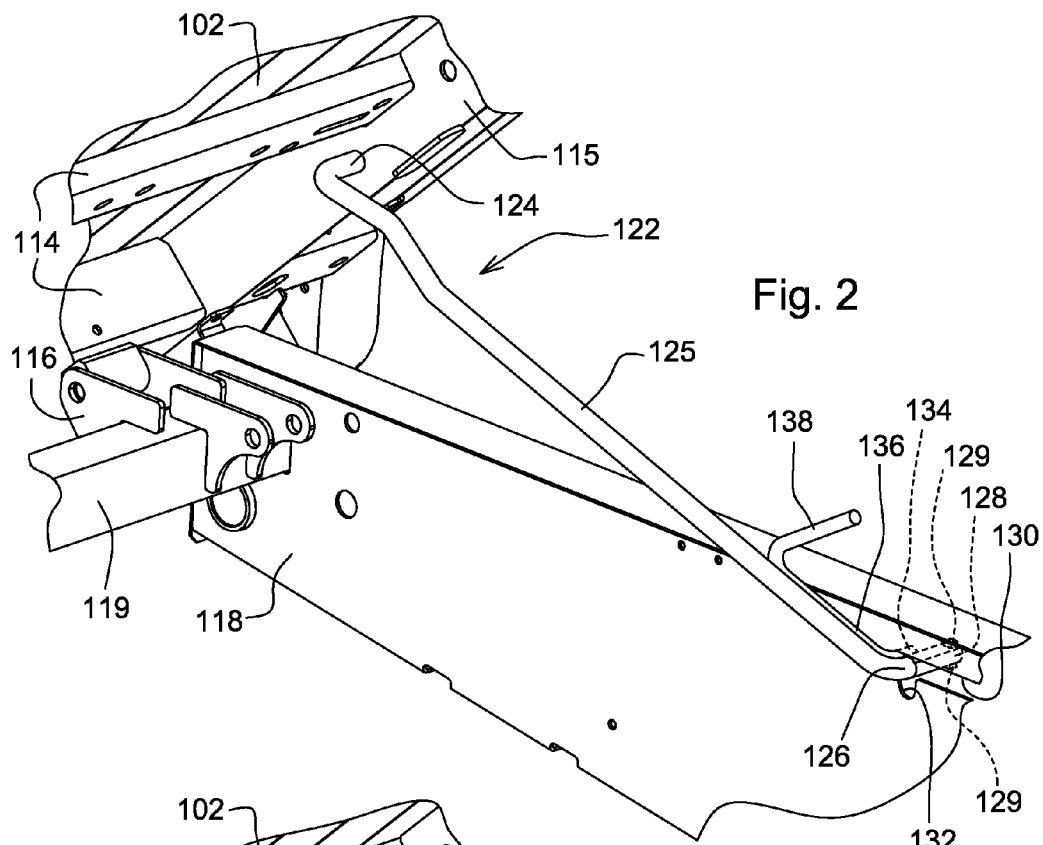
FIG. 2 is a perspective view of an on demand prop rod in a disengaged position according to a first embodiment of the invention.
Figure 3:
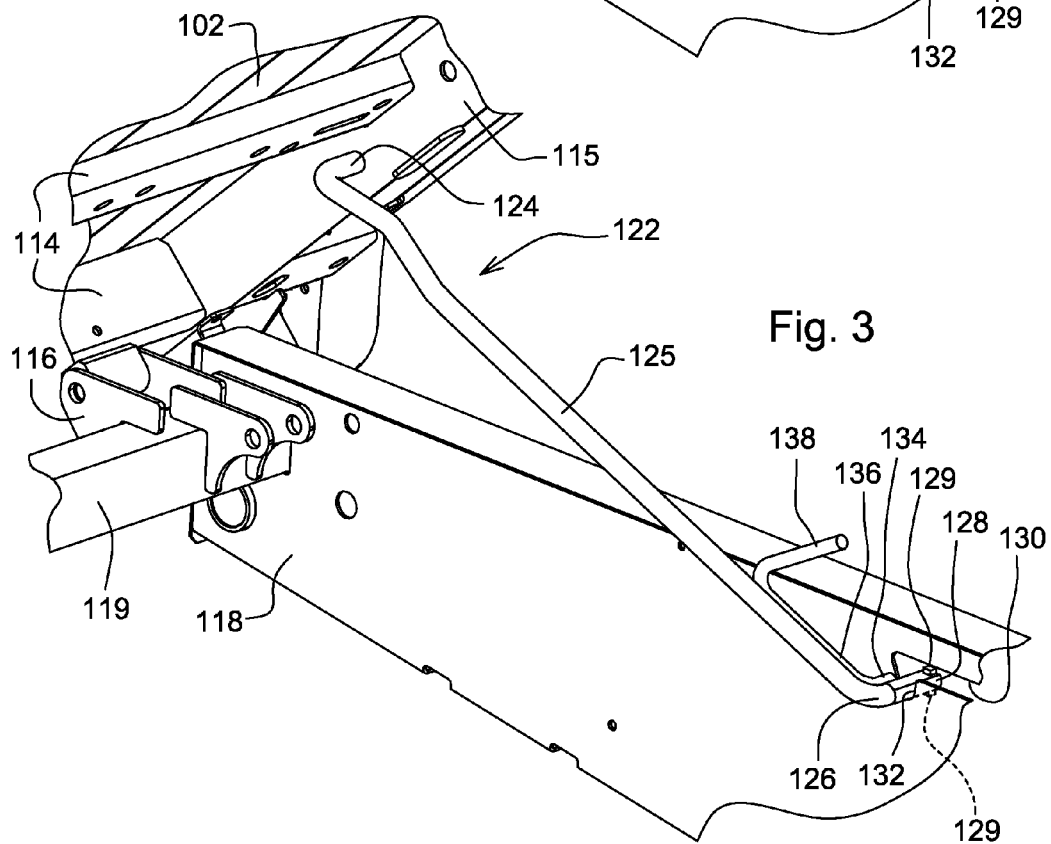
FIG. 3 is a perspective view of an on demand prop rod in an engaged position according to a first embodiment of the invention.

In one embodiment, slot or track 130 includes a downwardly directed seat or notch 132 at its rear portion which provides for nesting of leg member 128 in the engaged position of FIG. 3. However, the on demand prop rod may be biased toward the disengaged position shown in FIG. 2, so that the leg member cannot enter the seat or notch without the operator's action. Thus, the operator may raise and lower the cargo box without using the prop rod. If the operator wishes to use the prop rod, he or she may shift the rod from the disengaged position to the engaged position so that it can serve as an angled brace or support between the cargo box and the frame of the utility vehicle to secure the box in its raised or tilted orientation.

In one embodiment, bar 134 may be a rod or neck portion that is welded or otherwise secured to a rearwardly facing part of leg member 128. Leg member 128 extends at least about ½ inch further into the slot than does bar 134, so an operator may shift the prop rod to urge bar 134 out of the slot 130 while the longer leg member 128 remains within the slot.

In one embodiment, while bar 134 is still within slot 130, it blocks and prevents leg member 128 from moving downwardly to enter the seat or notch 132 at the rear of the slot. Bar 134 extends rearwardly from the leg member, allowing the bar and leg member to slide longitudinally along the slot or track 130. However, the combined thickness of the leg member and bar exceeds the width of the notch so that the end of the prop rod cannot move down into the notch. Thus, the bar keeps the prop rod in the disengaged position.

In one embodiment, the on demand prop rod may be sufficiently flexible so an operator may pivot or flex its lower end approximately ½ inch to 1 inch out and away from the slot in the utility vehicle frame member. Flexing the prop rod out in this manner can move bar 134 out of the slot or track, allowing the leg member to move down and enter the seat or notch by itself. This is how an operator can move the on demand prop rod to the engaged position.

In one embodiment, bar 134 may include a longitudinal portion 136 that extends several inches up the longitudinal portion 125 of the prop rod. Additionally, the longitudinal portion of the bar may be bent to provide handle 138. An operator may grip the handle to urge the lower end of the on demand prop rod outwardly to the engaged position, or to pull the lower end of the prop rod up from seat or notch 132 to disengage the prop rod before lowering the cargo box back down.

Having described a preferred embodiment, it will become apparent that various modifications can be made without departing from the scope of the invention as defined in the accompanying claims.

The invention claimed is:

1. A prop rod for a utility vehicle cargo box, comprising:
   a longitudinal slot in a frame member of the utility vehicle, the slot having a downwardly directed notch at a rear portion thereof;
   the prop rod having a first end pivotally connected to the utility vehicle cargo box and a second end slidable along the longitudinal slot; and
   a bar secured to the second end of the rod and slidable in the slot along with the prop rod and blocking the second end of the prop rod from entering the notch in a disengaged position; the bar being movable out from the slot so that the prop rod can enter the notch in an engaged position to support the utility vehicle cargo box in a raised position.

2. The prop rod of claim 1 further comprising a handle extending from the bar.

3. The prop rod of claim 1 wherein the bar is welded to a rear facing portion of the second end of the rod.

4. The prop rod of claim 1 wherein the prop rod biases the bar into the slot.

5. The prop rod of claim 1 wherein the prop rod flexes sufficiently to remove the bar from the slot.

6. The prop rod of claim 1 wherein the second end of the prop rod extends further into the slot than does the bar.

\* \* \* \* \*